Feb. 28, 1950    P. I. CHANDEYSSON    2,499,211
DYNAMOELECTRIC MACHINE AND METHOD OF MAKING SAME
Filed Feb. 13, 1947    2 Sheets-Sheet 1

INVENTOR:
PIERRE I. CHANDEYSSON

BY Bruinga and Sutherland
ATTORNEYS.

Feb. 28, 1950      P. I. CHANDEYSSON      2,499,211
DYNAMOELECTRIC MACHINE AND METHOD OF MAKING SAME
Filed Feb. 13, 1947      2 Sheets-Sheet 2
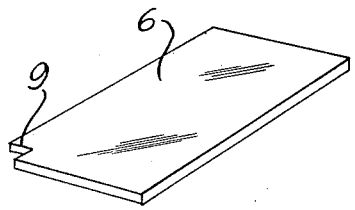
FIG. 3.
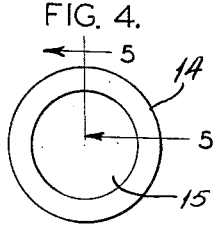
FIG. 4.
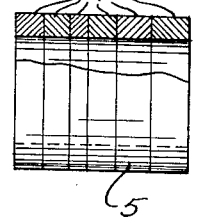
FIG. 5.
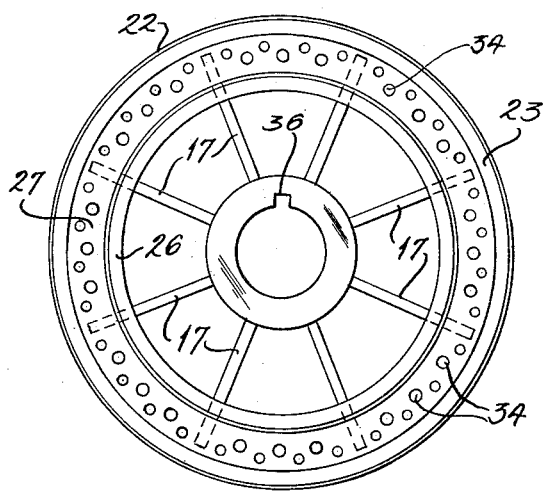
FIG. 7.
FIG. 6.
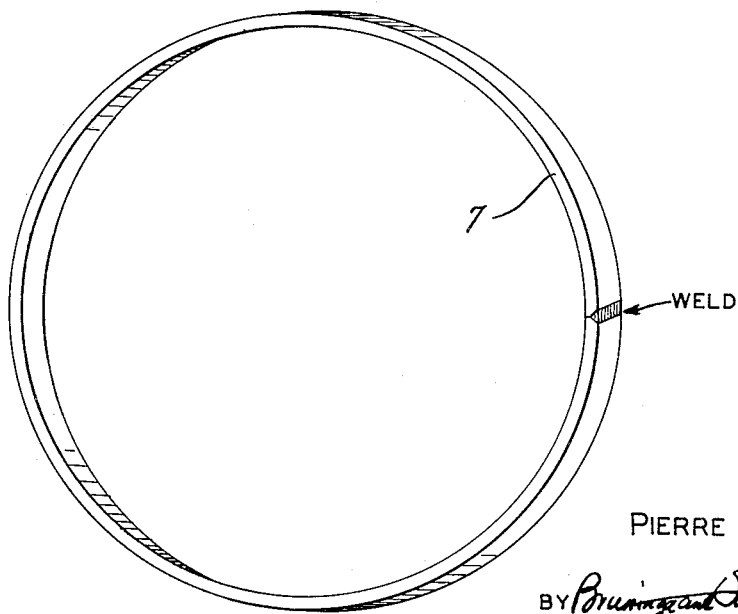
FIG. 8.
INVENTOR:
PIERRE I. CHANDEYSSON
BY Bruninga and Sutherland
ATTORNEYS.

Patented Feb. 28, 1950

2,499,211

UNITED STATES PATENT OFFICE 2,499,211

DYNAMOELECTRIC MACHINE AND METHOD OF MAKING SAME

Pierre Ismael Chandeysson, St. Louis, Mo.

Application February 13, 1947, Serial No. 728,234

4 Claims. (Cl. 171—252)

This invention relates generally to dynamoelectric machinery and particularly to rotor spiders therefor.

Heretofore the rotor spiders of heavy dynamoelectric machinery have been formed as unitary castings. While some efforts have been made to fabricate the rotors of fractional horsepower motors and other small dynamoelectric machines, it has heretofore been deemed impossible for various reasons to fabricate the rotors, and particularly the spiders, of heavy-duty machinery.

The formation of rotor spiders as a casting is inherently disadvantageous in that the great likelihood of defective castings, the presence of blow-holes, and other local imperfections, all of which are difficult to detect, compel the allowance of a liberal factor of safety and consequently increase the weight of such structures beyond the optimum.

The object of the present invention, generally stated, is to provide a rotor spider for a heavy-duty dynamoelectric machine, which is light in weight and withal sufficiently strong to endure the stresses to which it is subject in operation.

Another object of the invention is to provide a method of fabricating rotor spiders from sheet steel.

Other objects will become apparent to those skilled in the art when the following description is read in connection with the accompanying drawings, in which:

Figure 3 is a perspective view of the fin or spoke member of the armature spider shown in Figure 2;

Figure 4 is an end view of the hub of the armature spider shown in Figure 2;

Figure 5 is a view in side elevation, part being in section along the line 5—5 of Figure 4, of the hub;

Figure 6 is an outside end view of the commutator spider shown in Figure 1;

Figure 7 is a perspective view of the fin or spoke member of the commutator spider; and Figure 8 is a perspective view of one of the annular members entering into the construction of the armature spider.

In accordance with the present invention, generally stated, the several parts of rotor spiders for heavy-duty dynamoelectric machinery are fabricated from sheet steel. This includes not only the parts which constitute the rim or outer cylindrical members of the spider, but also the spokes and the hub. In the construction of the hub, a plurality of plates are laminated together so that the thickness dimension of the plates from which the laminae are cut cumulatively constitute the axial dimension of the hub. The rims or outer peripheral members of the spiders are formed of a plurality of flat sheet strips looped lengthwise and welded together at their ends to form annuli, in which the thickness of the strip constitutes the radial dimension of the loop. A plurality of such annuli are assembled together in axially spaced relation and secured in position by welding to a plurality of radially extending plates, which constitute the spokes of the spiders.

After the several parts are assembled and secured together by welding, the composite spider may be machined to true the peripheral surfaces thereof and otherwise machined as may be desirable to accommodate the other parts to be assembled therewith, such as the iron laminations of the armature and the commutator bars of the commutator.

Figure 1:
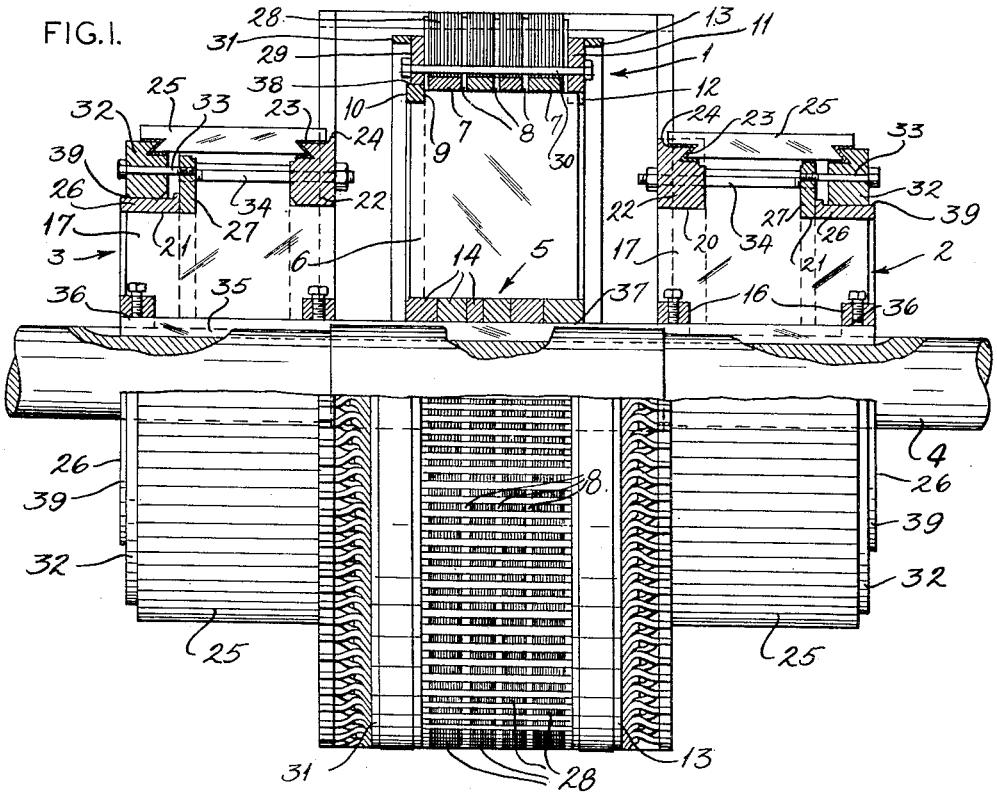
Figure 1 is a view in side elevation, partly in section, of a dynamoelectric machine rotor having an armature and commutator constructed in accordance with the present invention.
Figure 2:
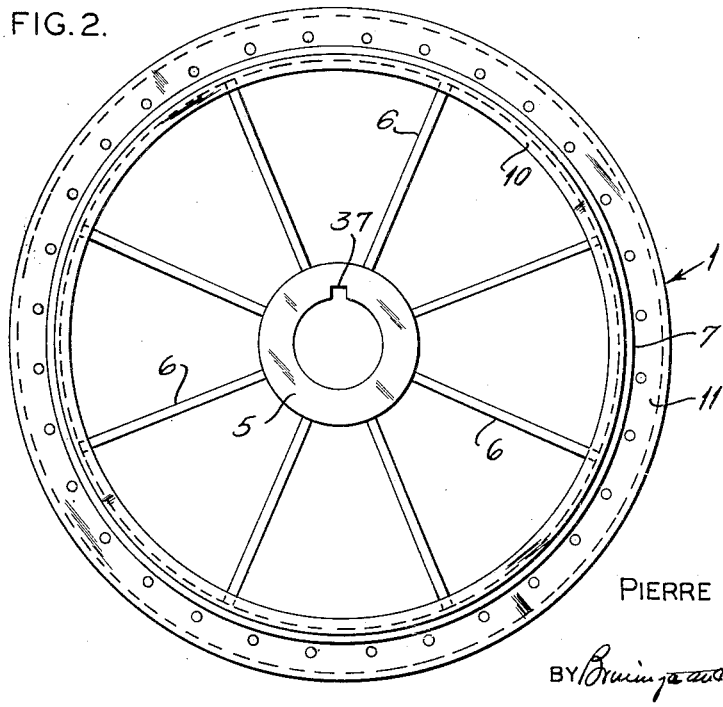
Figure 2 is a left end view of the armature spider shown in Figure 1.

Referring now to Figure 1 of the drawings for an illustrative embodiment of the invention, a generator armature is shown having two commutators. The invention is illustrated in connection with an armature for a high-current, low-voltage generator of the character employed in electroplating operations. In such a generator, the speed of the machine is slow, but the power output is great. Consequently, in its operation, the individual structural members of the rotor are subjected to less tension resulting from centrifugal force than is the case with high-speed machinery. The individual members of such a machine are, however, subjected to greater compressive and shearing stresses than are generally encountered in high-speed machinery.

The rotor shown in Figure 1 consists of an armature spider, generally indicated as 1, and two commutator spiders, generally indicated as 2 and 3, all mounted upon a shaft 4.

The armature spider consists of a hub 5, from which a plurality of plate-fins 6 extend so that the planes thereof are radial to the hub 5. The fins 6 are welded to the hub 5 in equispaced relation and, upon the outer extremities thereof, a plurality of annuli 7 are assembled and secured by welding. In the embodiment illustrated, the annuli 7 are arranged in axially spaced relation to provide open spaces 8 for the passage of air between the annuli. The several annuli 7 are formed of strips of rolled sheet steel looped lengthwise and welded together at their ends, as shown in Figure 8, so that the thickness dimension of the original strips constitute the radial thickness of each annulus.

The outer front corners of the several fins 6 are cut away to provide a recess 9, into which an annular band 10 is received and secured by welding. Like the annuli 7, the band 10 is preferably formed from a strip of flat steel stock looped lengthwise and welded at its ends.

A ring 11, which is formed from a strip of flat steel stock, is looped lengthwise, with its thickness constituting the axial dimension, and welded at its ends. The ring 11 is notched at 12 to accommodate the corner of each of fins 6. A further annular ring 13 is welded at the outer edge of ring 11.

The hub 5 is constructed of a plurality of blanks 14, as shown in Figure 5. The blanks 14 may be cut from sheets of rolled steel stock, the blanks having an exterior dimension but slightly in excess of the finished hub. The individual blanks 14 have a central hole 15 (of a diameter but slightly less than the interior diameter of the finished hub) cut therein prior to being assembled together. After being thus centrally perforated with the holes 15, the blanks 14 are stacked one upon the other and welded together so as to provide a composite hub constructed of a plurality of laminations of steel plate. The several blanks 14 constituting the hub 5 may be cut from steel plate of different thicknesses in order to achieve the desired axial dimension of the hub. Of course, all of the blanks 14 may be cut from the same sheet of steel when desirable. After the stack of blanks 14 is welded together, the rough hub may be machined, both exteriorly and interiorly, until the desired diameters are attained.

In the embodiment illustrated, the fins 6, annuli 7, the band 10, and the ring 11 are all formed from rolled sheet steel having the same thickness, which may be, for example, on the order of a half to three quarters of an inch. These parts are all secured together by welding. The use of rolled sheet steel in the fabrication of the hub, the rim, and the spokes of a spider in the manner aforesaid has the particular advantage of reducing the weight of the rotor to a fraction of that which is necessary when a cast spider is employed. Rolled sheet steel of the character contemplated by this invention is well known to be highly uniform in characteristics and in a practical sense free of local imperfections. Consequently, the necessity of allowing a liberal factor of safety and thus increasing the weight of the structure is obviated. Moreover, spiders fabricated in accordance with the present invention may be produced cheaper per unit of weight than the cast spiders heretofore utilized.

The commutator spiders 2 and 3 are constructed in a similar manner of rolled sheet steel strips or plates. Since the spiders 2 and 3 are identical, but shown in Figure 1 in reversed orientation, a description of but one of them will suffice. The hub of the commutator spider consists, in the embodiment shown, of a pair of plates 16 arranged in axially spaced relation and, as in the case of the blanks 14 for hub 5, may be cut from sheets of steel stock suitably perforated and machined to the appropriate diameter. If desired, each of the plates 16 may be composed of a plurality of laminae, as was the case with the hub 5 for the armature spider.

A plurality of fin-plates 17 having their opposite corners 18 and 19 cut away to accommodate the plates 16 are then secured to the latter by welding, so that the fin-plates 17 extend in a radial direction from the hub-plates 16.

The outer corners of the fin-plates 17 are relieved, as shown at 20 and 21 in Figure 7, to accommodate the peripheral members of the commutator spider. In the embodiment shown, the anterior ring member 22 of the commutator spider is formed of a bar of rolled steel stock looped lengthwise and its ends joined together by welding. The loop is secured in position in notch 20 of the fin-plates 17 and welded thereto. Preferably, when the ring 22 is applied to the fins 17, it has the cross sectional configuration indicated in dotted lines in Figure 1, but, after the assembly is complete, the ring 22 is machined to provide the circumferentially extending V-notch 23 and the shoulder 24 constituting part of the dove-tail connection for commutator bars 25.

In the notches 21 of the several fin-plates 17, a pair of rings 26 and 27 are received and welded. Rings 26 and 27 are likewise formed of strips of sheet steel stock looped lengthwise and joined at their ends by welding. Ring 26 is looped so that the thickness dimension of the strip constitutes the radial dimension of the ring, while ring 27 is looped so that the thickness dimension of the strip constitutes the axial dimension of the ring. All said parts 16, 17, 22, 26, and 27 are secured together in a unitary spider structure by welding at all joints. Any desired machining operations, either to true the surfaces or to accommodate adjunct parts, may be carried out after the assembly is complete.

Having completed the spiders, a multiplicity of iron laminations 28 is assembled upon the exterior periphery of the armature spider 1 in a manner well known to those skilled in the art and a ring 29 drawn down on the laminations by means of a bolt 30 extending through the ring, through slots in the laminations, and through an aperture in ring 11 of the armature spider. The ring 29 may be formed of a strip of sheet steel stock looped lengthwise in a manner comparable to the formation of ring 11 and provided with a flange member 31.

The commutator spiders 2 and 3 are provided with removable end rings 32 formed in a manner comparable to the formation of ring 22 and arranged to be drawn down taut upon the commutator bars by means of a bolt 33 extending through an aperture in the ring 32 and having threaded engagement with ring 27.

While in the embodiment shown, the commutator spiders are provided with a series of bolts 34, extending axially between rings 22 and 27, said bolts may be dispensed with and the welded connections between the fins 17 and rings 22 and 27 relied upon for retaining said parts in position. The bolts 34 do facilitate the initial assembly of the parts and maintain them in proper relative positions during the welding operation, although, when desired, other suitable clamping arrangements may be substituted.

The several spiders 1, 2, and 3 are secured against rotation relative to each other and relative to the shaft 4 by a suitable key 35 accommodated by keyways 36 in hub 5 and keyways 37 in plates 16.

In the construction of both the armature and commutator spiders according to the present invention particular attention is paid to providing proper radial support to inhibit twisting, and the tendency to invaginate, of the movable rings 29 and 32, respectively, when the bolts 30 and 33 are drawn up taut to clamp the myriad of parts (laminations 28 or commutator bars 25, as the case may be) in position on the spiders 1 and 2, respectively. When said bolts are tightened, the forces of action and reaction (being offset radially) produce a couple effect tending to turn the rings about their radially inward, axially outward, corners designated 38 and 39, respectively. This tendency is particularly noticeable with the commutator ring 32 where, due to the half-dovetail groove, the reaction force (upon tightening bolt 33) has a radially outward component tending to enlarge the diameter of ring 32. Consequently, care is exercised that the parts be accurately fitted without radial clearance and that the rings 10 and 26 be of sufficient axial extent to assure radial support for said corners 38 and 39. The ring 26 may desirably extend slightly beyond the corner 39 of ring 32, as shown.

In addition to the lightness and economy of manufacture of spiders constructed in accordance with the present invention, the fin-plates 6 and 17, when arranged as shown and described, have the additional advantage of forcing air circulation radially of the several parts and thus contributing substantially to the temperature characteristics of the dynamoelectric machine.

From the foregoing description, those skilled in the art will readily understand that the invention accomplishes its objects and provides a highly advantageous spider structure.

While in the foregoing description a complete disclosure of one particular armature spider structure and one particular commutator spider structure has been given, and such are typical of the constructions contemplated by the present invention, those skilled in the art will realize that the particular details thereof are subject to wide variation in accordance with the varying characteristics, sizes, and capacities of the dynamoelectric machines, and consequently it is to be distinctly understood that the invention is not limited to the details of the disclosure. While a generator armature has been chosen for illustration, it is likewise to be understood that the spider constructions of the present invention are applicable to motors.

Having thus described the invention, what is claimed and desired to be secured by Letters Patent is:

1. In a generator having a shaft, two commutator spiders mounted in spaced relation on the shaft, and an armature spider mounted on the shaft between the commutator spiders, all said spiders having hubs consisting of a plurality of perforated steel plates secured together.

2. In a rotor for a dynamoelectric machine, a fabricated spider having a fixed annular shoulder member at one end thereof secured thereto by welding, said spider having at its opposite end a fixed guide ring of lesser outside diameter than the annular shoulder, a removable ring having an outside diameter corresponding substantially to the outside diameter of said fixed annular shoulder and an inside diameter at its radially inward axially outward corner no greater than the outside diameter of said fixed guide ring, and a plurality of members assembled together in parallel relation and clamped axially between said fixed annular shoulder and said removable ring and with the axially outermost increment of said removable ring in radial engagement with said guide ring.

3. In a rotor for a dynamoelectric machine, a fabricated spider having a fixed annular shoulder member at one end thereof secured thereto by welding, said member having a half-dove-tail groove on the inner axial face thereof, said spider having at its opposite end a fixed guide ring of lesser outside diameter than the annular shoulder, a removable ring having a half-dove-tail groove on the inner axial face thereof and an outside diameter corresponding substantially to the outside diameter of said fixed annular shoulder and an inside diameter at its radially inward axially outward corner no greater than the outside diameter of said fixed guide ring, said parts being assembled together with a multiplicity of commutator bars clamped between the opposite half-dove-tail grooves and with the axially outermost increment of said removable ring in radial engagement with said guide ring.

4. In a rotor for a dynamoelectric machine, a fabricated spider having a fixed annular shoulder member at one end thereof secured thereto by welding, said spider having at its opposite end a fixed guide ring of lesser outside diameter than the annular shoulder, a hub, a plurality of steel-plate fins extending radially from the hub to said shoulder member and said guide ring and welded to the inner periphery thereof so as to radially support the same, a removable ring having an outside diameter corresponding substantially to the outside diameter of said fixed annular shoulder and an inside diameter at its radially inward, axally outward corner no greater than the outside diameter of said fixed guide ring, said parts being assembled together with laminations clamped between said fixed annular shoulder and said removable ring and with the axially outermost increment of said removable ring in radial engagement with said guide ring.

PIERRE ISMAEL CHANDEYSSON.

REFERENCES CITED

The following references are of record in the file of this patent:

UNITED STATES PATENTS

| Number | Name | Date |
|---|---|---|
| 823,568 | Waters | June 19, 1908 |
| 1,422,414 | Burke | July 11, 1922 |
| 1,687,513 | Reist | Oct. 16, 1928 |
| 1,731,350 | Putman | Oct. 15, 1929 |